(12) United States Patent  
Tanaka (10) Patent No.: US 7,764,164 B2  
(45) Date of Patent: Jul. 27, 2010

(54) RFID INTERROGATOR AND DATA COMMUNICATION METHOD THEREOF

(75) Inventor: Yoshinori Tanaka, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 841 days.

(21) Appl. No.: 11/414,419

(22) Filed: May 1, 2006

(65) Prior Publication Data  
US 2007/0046436 A1 Mar. 1, 2007

(30) Foreign Application Priority Data  
Aug. 30, 2005 (JP) ............... 2005-248988

(51) Int. Cl.  
H04Q 5/22 (2006.01)  
H03K 17/00 (2006.01)

(52) U.S. Cl. ............... 340/10.2; 340/2.2; 340/10.1; 340/10.3

(58) Field of Classification Search ............ 340/10.1, 340/10.2, 7.2, 521; 455/434; 370/344  
See application file for complete search history.

(56) References Cited

U.S. PATENT DOCUMENTS

| | | | |
|---|---|---|---|
| 3,816,708 A * | 6/1974 | Walton | 340/5.8 |
| 4,538,138 A * | 8/1985 | Harvey et al. | 340/521 |
| 5,448,761 A | 9/1995 | Ushirokawa | |
| 5,804,810 A | 9/1998 | Woolley et al. | |
| 6,052,585 A * | 4/2000 | Homma | 455/426.1 |
| 6,212,401 B1 * | 4/2001 | Ackley | 455/556.1 |
| 6,377,203 B1 | 4/2002 | Doany | |
| 6,459,360 B1 * | 10/2002 | Helferich | 340/7.52 |
| 6,998,978 B2 * | 2/2006 | Kirkeby | 340/539.12 |
| 2002/0134833 A1 | 9/2002 | Degrauwe et al. | |
| 2004/0046642 A1 | 3/2004 | Becker et al. | |
| 2005/0093679 A1 * | 5/2005 | Zai et al. | 340/10.2 |

(Continued)

FOREIGN PATENT DOCUMENTS

JP 10293824 11/1998

(Continued)

OTHER PUBLICATIONS

"Electromagnetic Compatibility and Radio Spectrum Matters (ERM); Radio Frequency Identification Equipment Operating in the Band 865 MHz to 868 MHz with Power Levels Up to 2 W; Part 1: Technical Requirements and Methods of Measurement," *ETSI 302 208-1 V1.1.1*, Sep. 2004.

(Continued)

*Primary Examiner*—Daniel Wu  
*Assistant Examiner*—Pameshanand Mahase  
(74) *Attorney, Agent, or Firm*—Hanify & King, P.C.

(57) ABSTRACT

An interrogator autonomously reduces interference of receiving radio waves in a wireless tag. The interrogator transmitting and receiving a signal to and from a wireless tag, comprises a carrier sense unit detecting an idle channel in a plurality of channels used for communications with the wireless tags, a transmitting unit transmitting the signal to the wireless tag by use of the detected idle channel, an abnormality detecting unit detecting communication abnormality in the communications with the wireless tag, and a control unit controlling so as to interrupt, when detecting the communication abnormality, the transmission to the wireless tag, re-detect an idle channel after an elapse of a predetermined transmission halt period, and resume the signal transmission to the wireless tag by using the re-detected idle channel.

10 Claims, 9 Drawing Sheets

U.S. PATENT DOCUMENTS

2006/0279409 A1  12/2006  Yang et al.

FOREIGN PATENT DOCUMENTS

| | | |
|---|---|---|
| JP | 2000-078644 | 3/2000 |
| JP | 2001307033 | 11/2001 |
| JP | 2004159250 | 6/2004 |
| JP | 2004266550 | 9/2004 |
| KR | 1020060124538 A | 12/2006 |
| WO | WO 01/57779 A1 | 8/2001 |

OTHER PUBLICATIONS

European Patent Office; extended European search report; Application No. EP 06 00 9778; Reference No. 114 946 a/npo; 7 pps.

Office Action and Search Report dated Aug. 20, 2009 issued in the corresponding Taiwan Patent Application No. 095114699.

Notice of Reason for Rejection dated Feb. 9, 2010 issued in Corresponding JP Patent Application No. 2005-248988.

\* cited by examiner

RFID INTERROGATOR AND DATA COMMUNICATION METHOD THEREOF

BACKGROUND OF THE INVENTION

1. Field of the Invention

The present invention relates to an RFID interrogator that transmits and receives a signal to and from a wireless tag through wireless communications, and to a data communication method with the wireless tag.

2. Description of the Related Art

There is an RFID (Radio Frequency Identification) technology as a technology for transferring and receiving information to and from the IC tag storing identification information etc. through the wireless communications.

The system employing this RFID technology is configured by an interrogator and a transponder. The interrogator accesses an IC chip defined as the transponder, and reads the information (e.g., ID information) written to this IC chip. Further, the interrogator often writes the information to this IC chip. Moreover, the transponder is the IC chip to which a unique piece of ID information is written, and is given a variety of nomenclatures such as an IC tag, a wireless IC tag, an RFID tag, an electronic tag and a wireless tag. In the following discussion, the transponder shall be called a [wireless tag].

Thus, in the system using the RFID technology, the RFID interrogator (which will hereinafter be simply referred to as an interrogator) reads and writes, in a non-contact state, the information from within and to the wireless tag. The wireless tag is exemplified such as operating by using radio waves transmitted from the interrogator as an energy source and responding in a way that carries the self-stored information on reflected waves of the radio waves.

Figure 7:
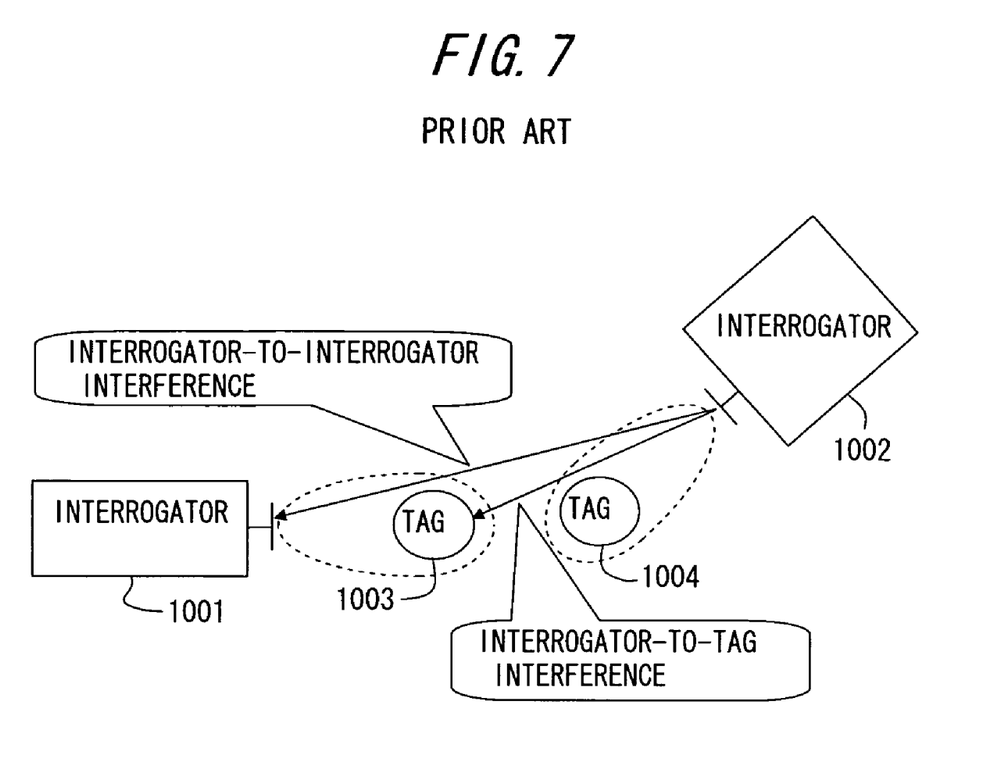
FIG. 7 is a diagram showing interference when installing a plurality of interrogators.

FIG. 7 illustrates an example of an architecture of this type of conventional RFID system. FIG. 7 shows the example of the architecture in which two interrogators 1001 and 1002 are installed adjacently. Thus, the plurality of interrogators are adjacently installed and respectively perform communications through on the radio waves with the wireless tags, in which case the radio waves transmitted by the respective interrogators interfere with each other between these individual interrogators. For example, the interference of the radio waves transmitted from the interrogator 1002 occurs in the interrogator 1001 in FIG. 7 (interrogator-to-interrogator interference). Further, the respective wireless tags, because of simultaneously receiving the radio waves from the plurality of adjacent interrogators, have the occurrence of the radio wave interference (interrogator-to-tag interference).

Given as a method of avoiding the aforementioned interrogator-to-interrogator interference is a method by which the individual interrogators conduct carrier sense (measurement of interference level in a selected channel) before starting the communications and thus search for an idle channel (refer to Non-Patent document 1). Namely, this method is a method of conducting control so that each interrogator performs the communications by use of a frequency channel different from a channel employed by the other interrogator.

Figure 8:
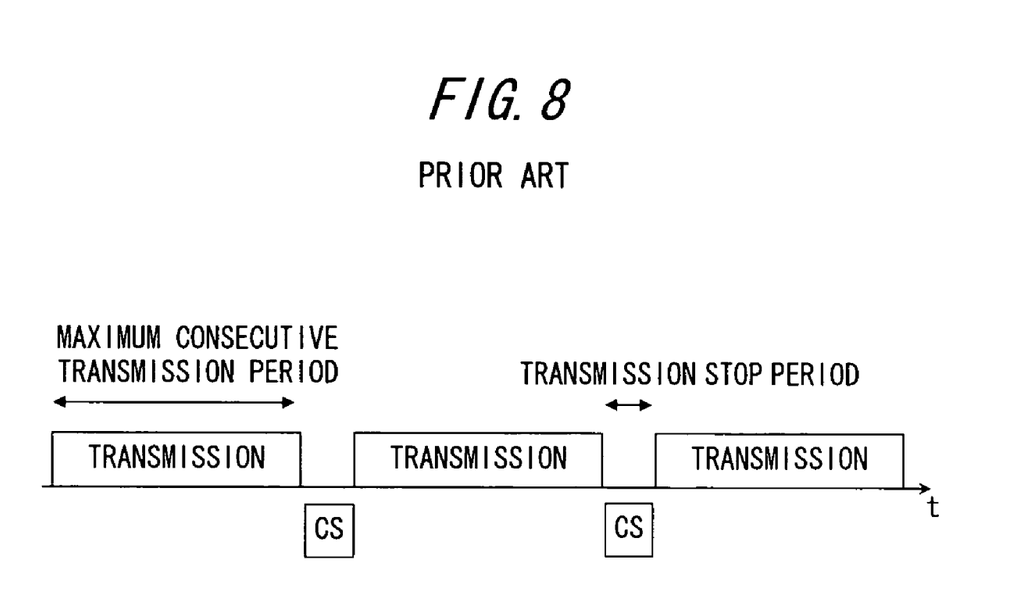
FIG. 8 is a diagram showing a transmission period and carrier sense.

In the system that executes the carrier sense, further, a maximum consecutive transmission period and a minimum transmission stop period are specified in order to impartially employ one channel between the respective interrogators (refer to Non-Patent document 1). FIG. 8 is a diagram showing a relationship between a transmission period (the maximum consecutive transmission period and the minimum transmission stop period) and the carrier sense on the same channel. As illustrated in FIG. 8, the interrogator performing the communications by acquiring a predetermined channel through the carrier sense, has a necessity of stopping the communications during a predetermined transmission stop period as the maximum consecutive transmission period elapses. With this contrivance, the interrogator standing by for the transmission gains a chance for acquiring the channel during the transmission stop period of the interrogator that has been in the process of the previous communications.

Figure 9:
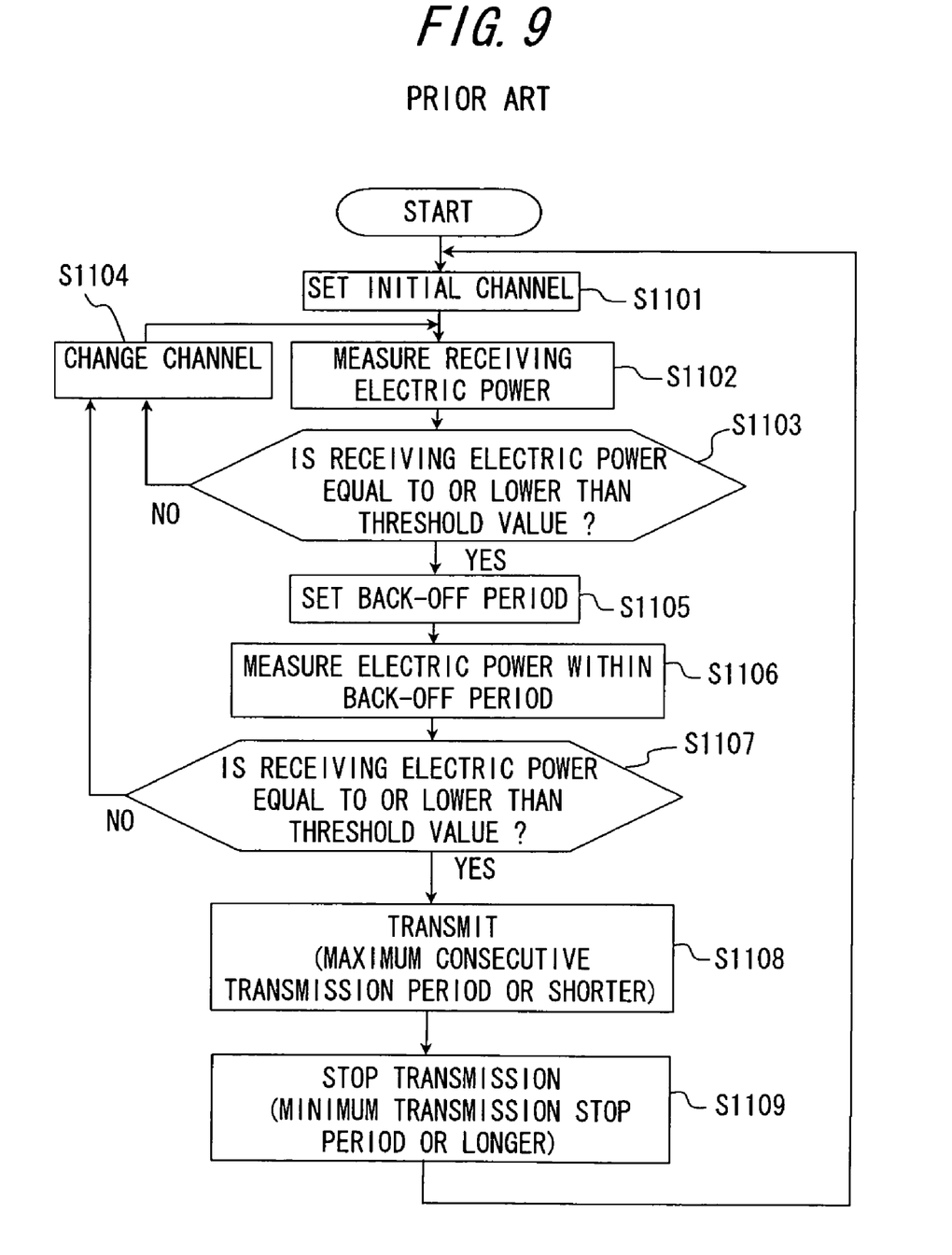
FIG. 9 is a flowchart showing a transmission control processing flow of a conventional interrogator.

A transmission process of the interrogator executing the carrier sense and also transmission control by using the maximum consecutive transmission period and the minimum transmission stop period, will hereinafter be explained with reference to FIG. 9. FIG. 9 is a flowchart showing a transmission processing flow of the interrogator.

The interrogator, on the occasion of communicating with the wireless tag, at first conducts the carrier sense (S1101 through S1107). When conducting the carrier sense, the interrogator, to begin with, sets an initial channel (a predetermined frequency) (S1101). Subsequently, the interrogator measures receiving electric power of the radio waves on this set channel (S1102). If the receiving electric power of the radio waves on the set channel is larger than a threshold value (S1103; NO), it is judged that this channel is already used by the other interrogator, and therefore the interrogator changes the previously-set channel to another channel (S1104).

While on the other hand, when judging that the receiving electric power of the radio waves on the set channel is equal to or smaller than the threshold value (S1103; YES), the interrogator sets a back-off period (a random wait period) (S1105). Then, the interrogator measures the receiving electric power of the radio waves received within the set back-off period (S1106). These processes are control for preventing the interference between the interrogators each performing the carrier sense at the same timing.

When judging that the receiving electric power thereof within the set back-off period is larger than the threshold value (S1107; NO), the interrogator judges that the channel was used by other interrogators during the back-off period, and therefore changes the previously-set channel to another channel (S1104). While on the other hand, when judging the receiving electric power within the set back-off period is equal to or smaller than the threshold value (S1107; YES), the interrogator judges that there does not exist the other interrogator having selected the same channel, and therefore starts the transmission on the set channel.

The interrogator acquiring the predetermined channel through the carrier sense performs the transmission by use of the acquired channel, however, a consecutively transmissible period is within the period specified as the maximum consecutive transmission period (S1108). Upon an elapse of the maximum consecutive transmission period, the interrogator keeps stopping the transmission for a minimum transmission stop period or longer (S1109). If there is a necessity of continuing a further transmission, upon an elapse of the minimum transmission stop period, the interrogator initiates the carrier sense again (S1101 through S1107).

The above-mentioned Non-Patent document 1 is "Electromagnetic compatibility and Radio spectrum Matters (ERM); Radio Frequency Identification Equipment operating in the band 865 MHz to 868 MHz with power levels up to 2 W; Part 1: Technical requirements and methods of measurement" (European Telecommunications Standards Institute, ETSI EN 302 208-1, 2004-09, V1.1.1, p. 10, 26).

However, the carrier sense of the interrogator described above is capable of avoiding the interrogator-to-interrogator interference by changing the channel to be used for each of the interrogators but is incapable of avoiding the interrogatorto-tag interference. This is because the majority of wireless tags do not have a function of a frequency filter etc., so that the data can be normally neither demodulated nor decoded in the case of simultaneously receiving the signals via different frequency channels.

A centralized control method using a control device is effective in reducing the interrogator-to-tag interference so that the transmissions of the plurality of neighboring interrogators do not overlap each other in time. In this method, however, a control procedure on the control device must be determined based on the interference condition among the interrogators, and hence a problem arises, wherein a complicated adjustment of the control procedure in accordance with a interrogator installation environment is required, and the operation becomes complicated.

SUMMARY OF THE INVENTION

It is an object of the present invention to provide an RFID interrogator that autonomously reduces the interference to wireless tags.

The present invention adopts the following configurations in order to solve the problems given above. Namely, the present invention is an interrogator transmitting and receiving a signal to and from a wireless tag, comprising a carrier sense unit detecting an idle channel in a plurality of channels used for communications with the wireless tag, a transmitting unit transmitting the signal to the wireless tag by use of the detected idle channel, an abnormality detecting unit detecting communication abnormality in the communications with the wireless tag, and a control unit performing control so as to interrupt, when detecting the communication abnormality, the transmission to the wireless tag, re-detect an idle channel after an elapse of a predetermined transmission halt period, and resume the signal transmission to the wireless tag by employing the re-detected idle channel.

In the present invention, the idle channel is detected by the carrier sense unit, and the transmission to the wireless tag is started by using this idle channel.

With this configuration, in the present invention, the transmission using the idle channel detected by the carrier sense is started, and it is therefore possible to avoid the signal interference among the neighboring interrogators.

It should be noted that the interrogator is, for example, an RFID reader or an RFID interrogator. Further, the wireless tag is, e.g., an IC chip to which a unique piece of ID information is written, and is called an IC tag, a wireless IC tag, an RFID tag, an electronic tag and so on.

Moreover, in the present invention, when detecting the communication abnormality in the communications with the wireless tag, the transmission to the wireless tag is interrupted, and, after the elapse of the predetermined transmission halt period, the carrier sense is performed again, thus resuming the signal transmission to the wireless tag.

According to the present invention, the transmission is interrupted upon detecting the communication abnormality, and hence it is possible to immediately avoid a case (interrogator-to-tag interference) in which the wireless tag gets into a communication unable state due to simultaneous reception of the signal transmitted via the different channel from the different interrogator.

Further, the respective interrogators can avoid the interference by the autonomous control without being connected to each other via a network in order to be controlled by a control device.

Moreover, the abnormality detecting unit may detect the communication abnormality within a predetermined timeout period from a point of time when starting the transmission of the signal to the wireless tag.

In the present invention, there is provided the predetermined timeout observation period in which its origin is the point of time when starting the transmission, the communication abnormality is detected within this timeout observation period, the transmission to the wireless tag is interrupted upon the detection of the communication abnormality, and, after the elapse of the predetermined transmission halt period, the carrier sense is again performed, thus resuming the signal transmission to the wireless tag.

While on the other hand, if beyond the timeout observation period, the communication abnormality, even when occurred, is not detected, and consequently the transmission continues.

Hence, according to the present invention, the interrogator having started the transmission earlier can avoid the interrogator-to-tag interference caused by the interrogator starting the transmission after the elapse of the timeout observation period.

Moreover, the control unit may further include a changing unit that changes the timeout period, corresponding to a priority level of the transmission to the wireless tag, wherein the abnormality detecting unit may detect the communication abnormality if the abnormality in the communications with the wireless tag continues for the timeout period.

In the present invention, the timeout period defined as the predetermined period for detecting the abnormality in the communications with the wireless tag serving as a communication partner device, is changed corresponding to the priority level of the transmission to the wireless tag.

Hence, according to the present invention, the timeout period is changed corresponding to the priority level of the transmission to the wireless tag, and hence, for instance, a longer timeout period can be used for higher priority level transmission in order to avoid being interrupted by the other transmissions with lower priority level. According to this contrivance, the communication interruption due to the detection of the communication abnormality can be made hard to occur corresponding to the priority level, and it is therefore feasible to actualize giving a transmission chance corresponding to the priority level of the transmission. Timeout period of same length can be used for transmissions with same priority level which results in equal chance for transmission.

Namely, according to the present invention, it is possible to avoid the interrogator-to-interrogator interference and the interrogator-to-tag interference and to control the transmission opportunity of interrogators.

Further, the changing unit determines the transmission priority level to the wireless tag, according to the number of the transmission timeouts due to the detection of the communication abnormality.

Therefore, according to the present invention, the priority level of the transmission to the wireless tag is determined according to the number of the transmission timeouts due to the detection of the communication abnormality, so that the transmission opportunity can be impartially given to among the plurality of interrogators by increasing, for instance, the priority level of the interrogator having large number of the transmission timeouts.

Moreover, the control unit, if a period of a consecutive transmission to the wireless tag exceeds a predetermined maximum consecutive transmission period, conducts the control so as to stop the transmission to the wireless tag, and makes the transmission halt period the equivalent length of time as the maximum consecutive transmission period.

Hence, according to the present invention, even when the transmission is interrupted due to the communication abnormality, the interrogator will not interrupt the other interrogator's transmission until the next carrier sense timing.

It is to be noted that the invention may also be a program actualizing any one of the functions given above. Still further, the present invention may also be a readable-by-computer storage medium recorded with such a program.

According to the present invention, the RFID interrogator can autonomously reduces the interference to the wireless tags.

BRIEF DESCRIPTION OF THE DRAWINGS

FIG. 2 (FIGS. 2(A) and 2(B)) is a diagram showing an outline of transmission control of the interrogator in a first embodiment;

FIG. 4 (FIGS. 4(A) and 4(B)) is a diagram showing an outline of the transmission control of the interrogators in a second embodiment (a case of two interrogators);

FIG. 5 (FIGS. 5(A), 5(B) and 5(C)) is a diagram showing an outline of the transmission control of the interrogators in the second embodiment (a case of three interrogators);

DESCRIPTION OF THE PREFERRED EMBODIMENTS

An RFID interrogator (which will hereinafter be simply referred to as a interrogator) in each of embodiments of the present invention will hereinafter be described with reference to the drawings. It should be noted that configurations of the embodiments, which will hereinafter be discussed, are exemplifications, and the present invention is not limited to the configurations of the following embodiments. Further, a [wireless tag] and a [interrogator] in the following discussion shall be the same as those explained in the item of Background Arts.

First Embodiment

The interrogator in a first embodiment of the present invention will hereinafter be explained.

[Device Configuration]

Figure 1:
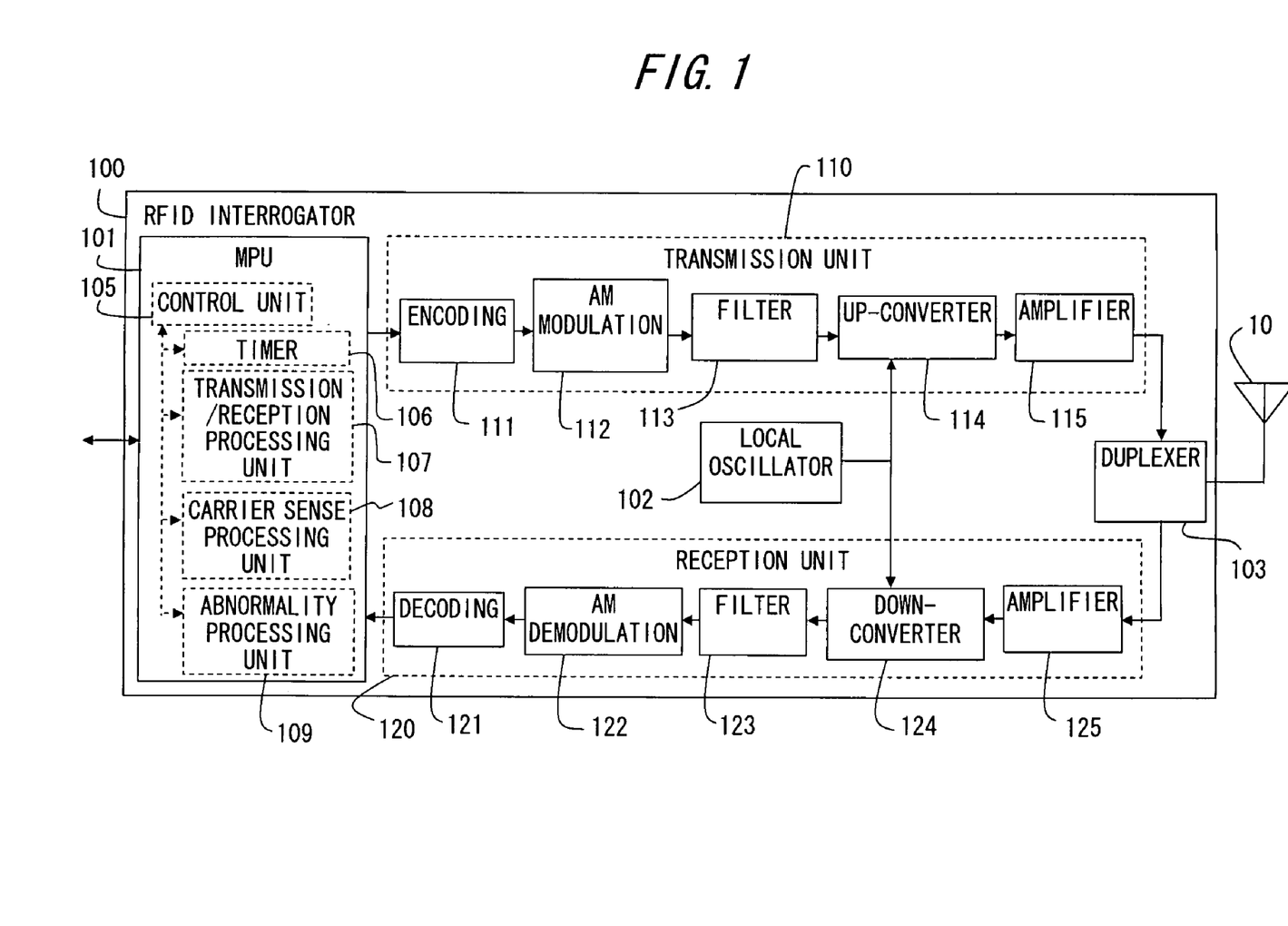
FIG. 1 is a block diagram showing a device configuration of an RFID interrogator.

A device configuration of the interrogator in the first embodiment will be explained with reference to FIG. 1. FIG. 1 is a block diagram showing the device configuration of the interrogator in the first embodiment.

A interrogator 100 in this embodiment is constructed of an antenna 10, a microprocessor (which will hereinafter be termed an MPU) 101, a local oscillator 102, a duplexer 103, a transmitting unit 110 and a receiving unit 120. Then, the transmitting unit 110 further includes an encoding unit 111, an AM (Amplitude Modulation) modulation unit 112, a filtering unit 113, an up-converter unit 114 and an amplifier unit 115. Further, the receiving unit 120 further includes a decoding unit 121, an AM demodulation unit 122, a filtering unit 123, a down-converter unit 124 and an amplifier unit 125.

Among these function units, other function units excluding the MPU 101 are function units for actually performing the communications with the wireless tag and are controlled by the MPU 101. The MPU 101 executes a control program stored in a memory (unillustrated) etc., thereby executing an RFID transmission control related to the present invention in a way that controls those other function units described above. The present invention puts a focus on a technology related to this type of RFID transmission control, and hence the other function units excluding the MPU 101 are, if constructed to enable the communications with the wireless tag, not limited to those given above.

Note that a control unit 105 (corresponding to a control unit according to the present invention), a timer 106, a transmission/reception processing unit 107 (corresponding to a transmitting unit according to the present invention), a carrier sense processing unit 108 (corresponding to a carrier sense unit according to the present invention) and an abnormality processing unit 109 (corresponding to an abnormality detection unit according to the present invention) in FIG. 1, represent respective function of an RFID transmission control program executed by the MPU 101. Further, the MPU 101 may transmit and receive data to and from other control devices via an input/output interface (unillustrated).

A brief description of each of the function units for performing the actual communications with the wireless tag will be given.

The encoding unit 111 encodes transmission data (containing a read command, a write command, etc. to the wireless tag) transferred from the MPU 101, and transfers the encoded signals to the AM modulation unit 112.

The AM modulation unit 112 executes an amplitude modulation process on the encoded transmission signals. The modulated signals are transferred to the filtering unit 113.

The filtering unit 113 extracts a signal having a desired frequency component from within the modulated signals. The bandwidth of the filtering unit may be changed under transmission control by the MPU 101. The filtered signal is transferred to the up-converter unit 114.

The up-converter 114 converts the filtered signal into a radio-frequency (RF) signal by mixing the filtered signal with an output signal from the local oscillator 102. The signal converted into the RF signal is transferred to the amplifier unit 115.

The local oscillator 102 oscillates a carrier frequency of RF signal for the up-converter unit 114. The oscillated frequency of the local oscillator 102 may be controlled in order to transmit the signal via a predetermined channel selected under the control by the MPU 101.

The amplifier unit 115 amplifies the converted high-frequency signal. The amplified signal is transmitted from the antenna 10 via the duplexer 103. The duplexer 103 is the function unit for sharing the antenna 10 with the transmitting unit 110 and the receiving unit 120. The antenna 10 is employed for transmitting and receiving the radio waves to and from the wireless tag. The signal transmitted at the predetermined carrier frequency from the antenna 10 is received by the wireless tag. Then, the wireless tag transmits, for example, the self-stored information back in a way that carries the information on the reflected waves of the received carrier. It is to be noted that this embodiment takes the configuration of sharing the single antenna 10 by providing the duplexer 103, however, two pieces of antennas for transmission and reception may also be provided.

Next, the respective function units configuring the receiving unit 120 will be explained.

The amplifier unit 125 amplifies a signal received by the antenna 10 and further received via the duplexer 103. The amplifier unit 125 may involve using a low-noise amplifier to reduce a noise in the amplified signal. The amplified signal is transferred to the down-converter unit 124.

The down-converter unit 124 converts the amplified signal into a base-band signal by mixing the amplified signal with the output signal from the local oscillator 102. The converted signal is transferred to the filtering unit 123.

The filtering unit 123 extracts a signal having a desired frequency component from the converted signal. The bandwidth of the filtering unit may be changed under the transmission control by the MPU 101. The filtered signal is transferred to the AM demodulation unit 122.

The AM demodulation unit 122 executes a demodulation process on the filtered signal. The demodulated signal is decoded by the decoding unit 121. The decoded data is transferred to the MPU 101.

Given next is an explanation of each of the functions of the control program executed by the MPU 101. The interrogator 100 in this embodiment actualizes the RFID transmission control by these respective functions.

The carrier sense processing unit 108 conducts the carrier sense. To be specific, the carrier sense processing unit 108 detects an idle channel in the plurality of channels employed for the communications with the wireless tag. The carrier sense processing unit 108 extracts the signal having a set frequency by setting the predetermined frequency in, e.g., the local oscillator 102 and in the filtering unit 123, then measures receiving electric power of the extracted signal component by use of an electric power measuring unit (unillustrated), and may detect based on the measured receiving electric power whether the channel is the idle channel or not.

The transmission/reception processing unit 107 executes a process of the data transmitted and received for the communications with the wireless tag. The transmission/reception processing unit 107 outputs the transmission signals such as the read command and the write command to the encoding unit 111. The output signals are subjected to signal processing by the respective functions configuring the transmitting unit 110 and then transmitted to the wireless tag. Further, the transmission/reception processing unit 107 obtains a reception signal from the decoding unit 121.

The abnormality processing unit 109 detects communication abnormality in the communications with the wireless tag. The communication abnormality is, for instance, detected if there is no response from the wireless tag for a fixed period of time or if a transmission error in the reception signal received by the transmission/reception processing unit 107 continues for the fixed period of time. The detection of the communication abnormality by the abnormality processing unit 109 involves employing a timeout period etc.

The timer 106 measures the respective periods of time (the timeout period, the maximum consecutive transmission period, the timeout observation period, the minimum transmission stop period) monitored by the RFID transmission control. The timeout period is a communication abnormality continuous period for which the communication abnormality is detected. For example, the abnormality processing unit 109, if the abnormality in the communications with the wireless tag continues for the predetermined timeout period, detects the communication abnormality. Explanations of the other predetermined periods will be made in an item of Operational Example.

The control unit 105 controls the start or the stop of each of the transmission/reception processing unit 107, the carrier sense processing unit 108, the abnormality processing unit 109, etc., corresponding to the period monitored by the timer 106. Further, the transmission to the wireless tag may also be stopped, simultaneously when the processing of the transmission/reception processing unit 107 is stopped, by stopping the power supply to the amplifier unit 115 etc., or by stopping the transmission of the transmission signal from the MPU 101. The control unit 105 actualizes the transmission control that will be discussed in the following operational example.

OPERATIONAL EXAMPLE

Figure 2A:
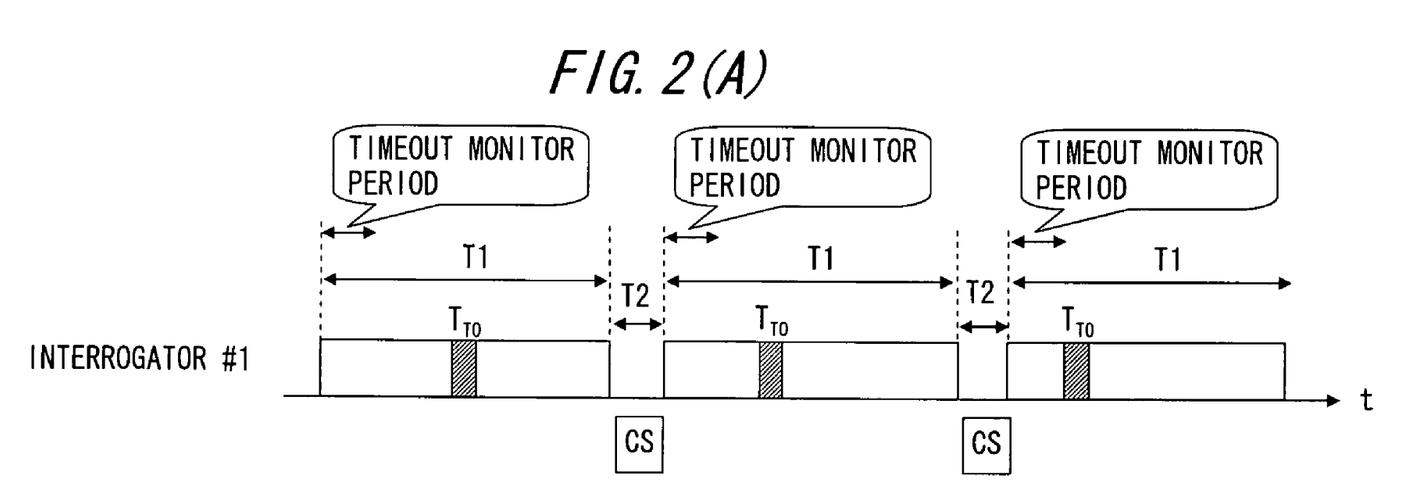
Figure 2B:
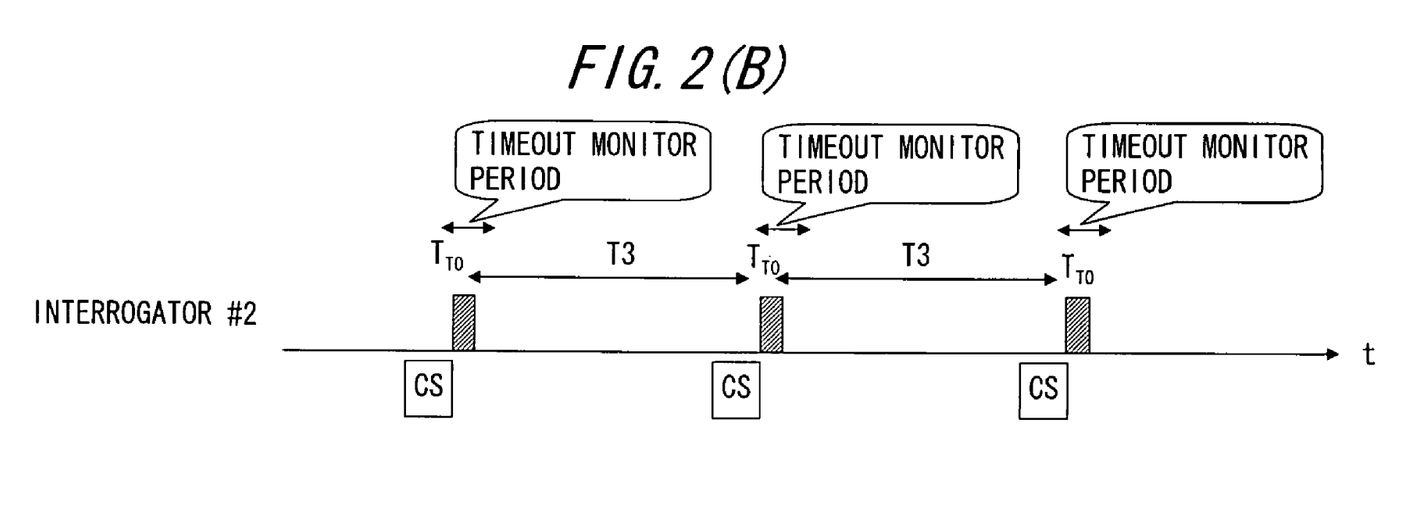

Next, an operational example of the interrogator in the first embodiment will be explained with reference to FIG. 2. FIG. 2 is a diagram showing an outline of the transmission control of the interrogator in the first embodiment. The following is a description of the transmission control executed by the MPU 101.

FIG. 2 illustrates how, in a case where two interrogators (interrogators #1 and #2) adjacent to each other perform the communications with wireless tags, these interrogators #1 and #2 execute the transmission control. Further, in FIG. 2, the horizontal axis represents the time, wherein a white-voided quadrangle along on the time-base indicates the data transmission between the interrogator and the wireless tag, while a hatching quadrangle indicates a communication unable state with the wireless tag, and a symbol CS designates the carrier sense processing. The operations of the interrogators #1 and #2 will hereinafter be explained based on the example in FIG. 2.

The interrogator #1, when selecting the predetermined idle channel through the carrier sense (the carrier sense processing unit 108), starts transmitting the signal (the transmission/reception processing unit 107) to the wireless tag by employing this idle channel.

Along with the start of the transmission, the interrogator #1 monitors an elapse of the timeout observation period. The timeout observation period is a timeout observation time window, wherein its origin is a point of time when starting the transmission. If the timeout is detected in this time window, the interrogator stops the transmission for a fixed period of time. The timeout herein connotes that each interrogator detects that the communications with the wireless tag are not normally conducted. For example, the interrogator detects the timeout if the communication abnormality continues for a predetermined period (the timeout period ($T_{TO}$) shown in FIG. 2) or longer.

The timeout detection is, if unable to normally obtain, e.g., a reception signal from the decoding unit 121 after sending a command signal to the encoding unit 111, made in the way that the timer 106 in the MPU 101 monitors such a communication abnormal period. Further, the case of being unable to obtain the normal reception signal from the decoding unit 121 corresponds to such a case that there is no response from the wireless tag for the fixed period of time or the transmission error continues for the fixed period of time.

In the example in FIG. 2, the interrogator #1 continues the transmission as it is because of detecting none of the timeout in the communications with the wireless tag during the timeout monitor period. Then, the interrogator #1, upon an elapse of the maximum consecutive transmission period (T1), stops the transmission. In the case of desiring to continue a further transmission, the interrogator #1, after the minimum transmission stop period (T2) has elapsed, resumes the transmission through redoing the carrier sense.

On the other hand, the interrogator #2, when detecting the idle channel which may not be used by the interrogator #1 through the carrier sense, starts transmitting the signal to the target wireless tags of the interrogator #2 by using this idle channel for communication.

At this time, if the wireless tag in the process of communicating with the interrogator #1 and the communication target wireless tag of the interrogator #2 get into such a reception unable state that there occurs a cross-talk of the signal from the interrogator #1 and the signal from the interrogator #2, the interrogators #1 and #2 are unable to receive the signals back from the wireless tags (the hatching quadrangles shown in FIG. 2). Thus, both of the interrogators #1 and #2 detect the timeout.

The interrogator #1, as this timeout detection timing is beyond the timeout observation period, ignores the detected timeout and continues the communication with tags. On the other hand, the interrogator #2, as this timeout detection timing is within the timeout observation period, keeps stopping the transmission for a fixed period (T3). With this contrivance, the wireless tag in the process of communicating with the interrogator #1 comes to a communication-enabled state, wherein the wireless tag again receives only the signal from the interrogator #1. As a result, in the interrogator #1, after an elapse of the timeout period ($T_{TO}$), the communications with the wireless tag get back to the normal state. Herein, the fixed period (T3) corresponds to a transmission halt period according to the present invention.

The interrogator #2, after the fixed period (T3) has elapsed, tries to start the transmission by redoing the carrier sense. In the example in FIG. 2, transmission resumption timing in the interrogator #2 overlaps twice with the transmission timing of the interrogator #1, and therefore both of the transmissions are stopped.

Note that the fixed period (T3) may be set to substantially the same length of time as the maximum consecutive transmission period (T1) has (T3 may also be longer than T1). With this setting, even when the transmission is interrupted due to the communication abnormality, it does not happen that the transmission of the interrogator continuing the normal transmission is hindered till there is a chance of acquiring the next carrier sense.

<Operation Flow>

Figure 3:
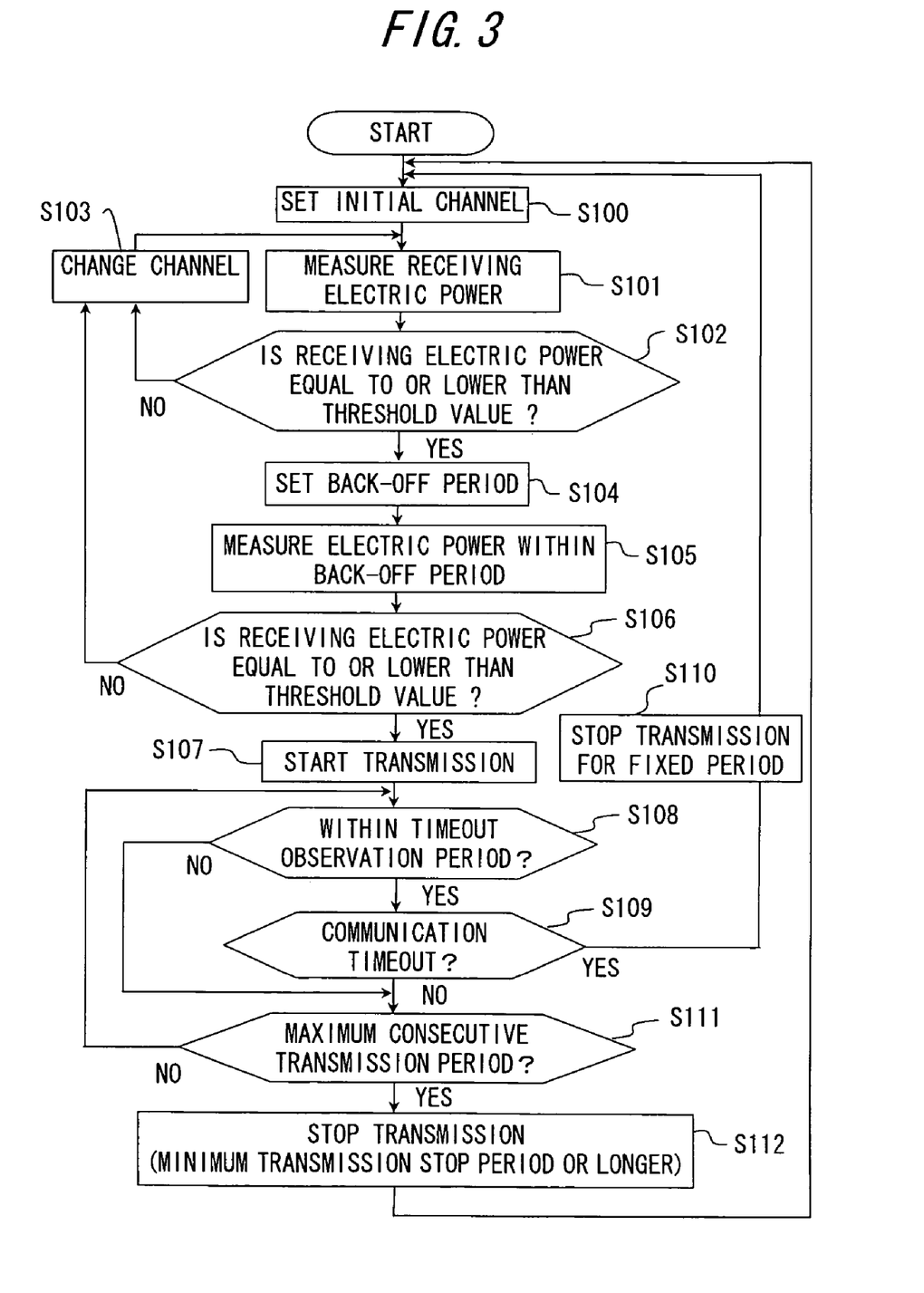
FIG. 3 is a flowchart showing a transmission control processing flow of the interrogator in the first embodiment.

In a processing flow of the transmission control of the interrogator in the first embodiment will hereinafter be explained with reference to FIG. 3. FIG. 3 is a flowchart showing the transmission control processing flow of the interrogator in the first embodiment.

The interrogator, when communicating with the wireless tag, at first, conducts the carrier sense (S100 through S106). The interrogator sets an initial channel (a predetermined frequency) (S100), and measures receiving electric power of the radio waves on this set channel (S101). If the receiving electric power of the radio waves on the set channel is larger than a threshold value (S102; NO), it is judged that this channel is used by the other interrogator, and therefore the interrogator changes the previously-set channel to another channel (S103).

While on the other hand, when judging that the receiving electric power of the radio waves on the set channel is equal to or smaller than the threshold value (S102; YES), the interrogator sets a back-off period (a random wait period) (S104).

Then, the interrogator measures the receiving electric power of the radio waves received within the set back-off period (S105).

When judging that the receiving electric power thereof within the set back-off period is larger than the threshold value (S106; NO), the interrogator changes the previously-set channel to another channel (S103). While on the other hand, when judging the receiving electric power within the set back-off period is equal to or smaller than the threshold value (S106; YES), the interrogator starts the transmission on the set channel (S107).

The interrogator, when starting the transmission, monitors the communication timeout within the predetermined timeout observation period from a point of this transmission starting time (S108 and S109). The interrogator, when detecting the timeout (S109; YES) within this timeout observation period (S108; YES), keeps stopping the transmission for the fixed period of time (S110). In the case of performing a further transmission, it follows that the interrogator executes again the processing from the carrier sense after stopping the transmission for the fixed period of time (S100).

Whereas if normally transmitted without the communication timeout being detected (S109; NO), the interrogator can continue the transmission till the maximum consecutive transmission period elapses (S111; NO). Note that even if the communication timeout occurs beyond the timeout observation period (S108; NO), the transmission continues by way of the retransmission etc., and the transmission process continues till the maximum consecutive transmission period elapses.

When the maximum consecutive transmission period elapses during the continuation of the transmission (S111; YES), the interrogator keeps stopping the transmission for the minimum transmission stop period or longer (S112). The interrogator, in the case of performing a further transmission, after the elapse of the minimum transmission stop period, executes again the processing from the carrier sense (S100).

<Operation/Effect in First Embodiment>

Herein, an operation and an effect of the interrogator in the first embodiment discussed above will be described.

In the interrogator in this embodiment, at first, the idle channel is detected through the carrier sense, and the transmission is started. Then, there is provided the predetermined timeout observation period in which its origin is the point of time when starting the transmission, and, when the timeout is detected in the communications with the wireless tag within the timeout observation period, the carrier sense is redone after stopping the transmission for the fixed period of time.

Whereas if beyond the timeout observation period, even when the timeout is detected, the transmission continues by way of the retransmission etc.

Namely, in the interrogator in this embodiment, the transmission is started via the idle channel detected by the carrier sense, and it is therefore possible to avoid the signal interference among the neighboring interrogators.

Moreover, in the interrogator in this embodiment, if the timeout occurs within the timeout observation period, the transmission is kept stopping for the fixed period of time, and hence it is feasible to avoid such a case (the interrogator-to-tag interference) that the wireless tag gets into the communication unable state due to the simultaneous reception of the signal transmitted via the different channel from the different interrogator. Namely, the interrogator starting the transmission earlier can avoid the interrogator-to-tag interference caused by the interrogator starting the transmission after the elapse of the timeout observation period.

Further, the respective interrogators are capable of avoiding the interference by the autonomous control without being connected to each other via the network and controlled in centralization.

Second Embodiment

The interrogator according a second embodiment of the present invention will hereinafter be described. The first embodiment discussed earlier is that there is provided the timeout observation period in which its origin is the point of time when starting the transmission, then the transmission is kept stopping for the fixed period of time if the timeout occurs within the timeout observation period, and the processing is executed again from the carrier sense. The interrogator in the second embodiment is contrived to impartially give a chance for the transmission between the interrogators while avoiding the interference in the wireless tag by eliminating the timeout observation period in the first embodiment.

[Device Configuration]

The interrogator in the second embodiment is constructed of the same function units as those in the first embodiment but has a difference in terms of a content of the transmission control by the MPU 101. Therefore, the explanation of the device configuration is omitted.

OPERATIONAL EXAMPLE

Figure 4A:
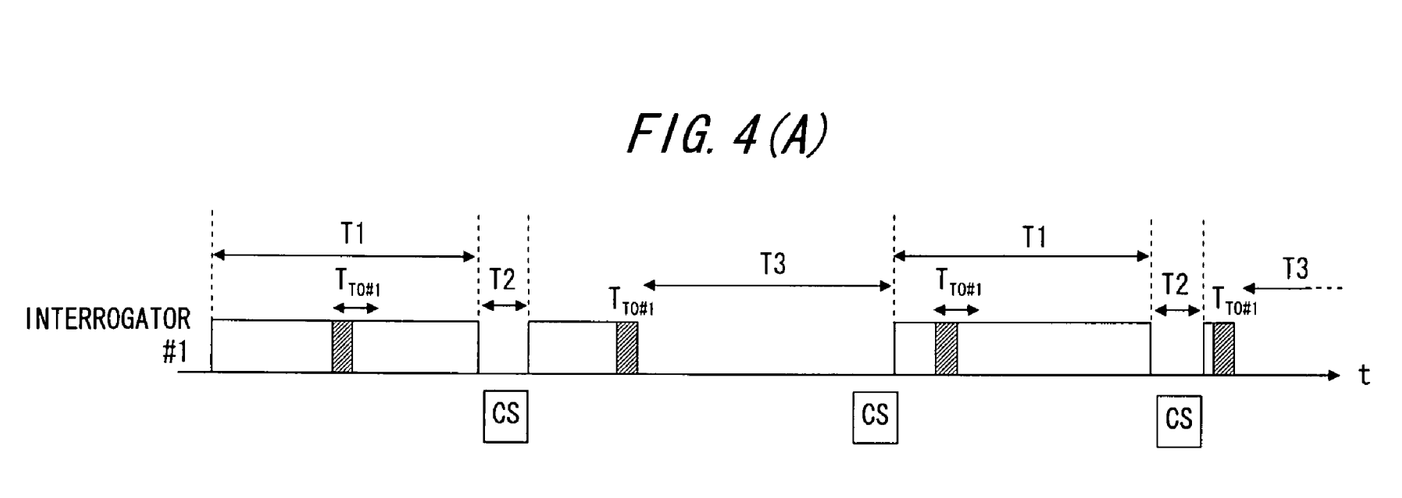
Figure 4B:
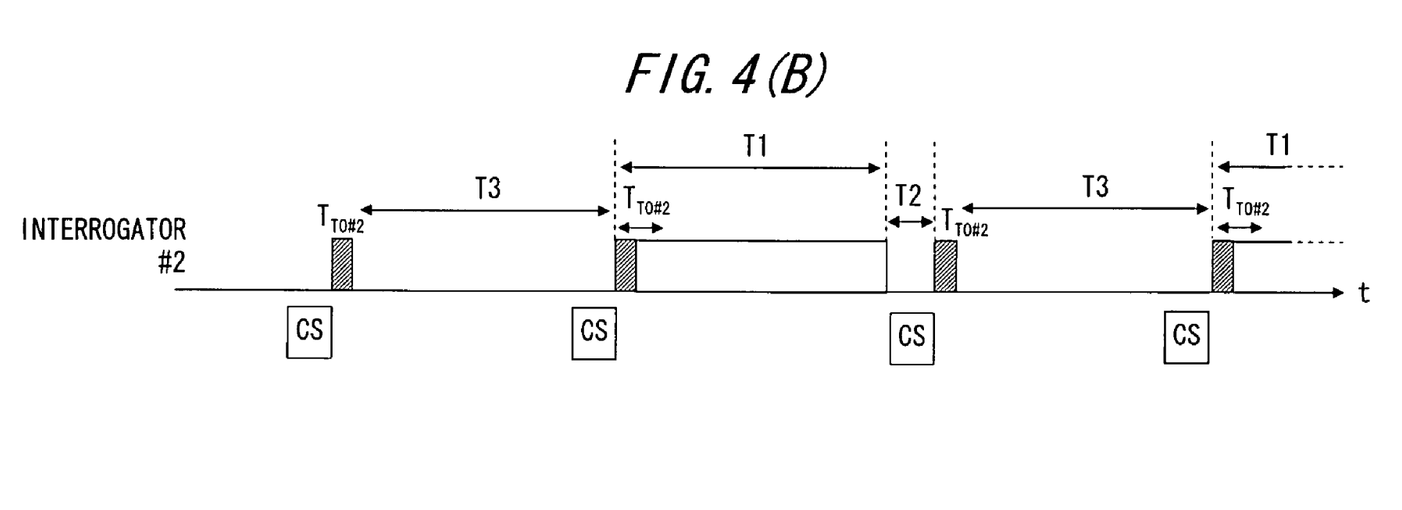

An operational example of the interrogator in the second embodiment will be explained with reference to FIG. 4. FIG. 4 is a diagram showing an outline of the transmission control in a case where two interrogators in the second embodiment are adjacently installed and thus operated. The following is a description of the transmission control executed by the MPU 101, wherein the MPU 101 controls the respective function units to actualize the following operation.

FIG. 4 illustrates how, in a case where two interrogators (interrogators #1 and #2) adjacent to each other perform the communications with the respective communication target wireless tags, these interrogators #1 and #2 execute the transmission control. Further, in FIG. 4, the horizontal axis represents the time, wherein a white-voided quadrangle along on the time-base indicates the data transmission between the interrogator and the wireless tag, while a hatching quadrangle indicates a communication unable state with the wireless tag, and a symbol CS designates the carrier sense processing. The operations of the interrogators #1 and #2 will hereinafter be explained by way of the example in FIG. 4.

The interrogator #1 selects a predetermined idle channel through the carrier sense, and starts transmitting the signal to the wireless tag by employing this idle channel. Here, the interrogator #2 starts the communications with the communication target wireless tag of the interrogator #2 by use of anther idle channel. With this operation, the wireless tag in the process of communicating with the interrogator #1 and the communication target wireless tag of the interrogator #2 receive the signals from both of the interrogators #1 and #2 and consequently get into the communication unable state.

At this time, a predetermined timeout period ($T_{TO}$) is set in the interrogators #1 and #2, respectively. When the interrogator is in the initial state, an initial timeout period ($T_{INIT}$) is set in this timeout period ($T_{TO}$). A random period of time is set in the initial timeout period ($T_{INIT}$) in each of the interrogators. A random period of time such as 200 milliseconds (ms) through 400 ms may also be set in the initial timeout period ($T_{INIT}$).

FIG. 4 shows an example of the case where a timeout period ($T_{TO\#1}$) of the interrogator #1 is set longer than a timeout period ($T_{TO\#2}$) of the interrogator #2. With this setting, the interrogator #2 detects the timeout earlier than the interrogator #1 does. Note that in the communication abnormal state till the timeout is detected, each interrogator continues the transmission by way of the retransmission etc., and hence the communication unable state of the wireless tag continues.

The interrogator #2 detecting the timeout keeps stopping the transmission for a fixed period (T3). With this stoppage, the wireless tag, which was in the process of communicating with the interrogator #1, again comes to receive only the signal transmitted from the interrogator #1, thus resuming the normal communications. As a result, the interrogator #1, as the communication state is restored to the normal state before an elapse of its own timeout period ($T_{TO\#1}$), has no detection of the timeout and directly continues the transmission.

The interrogator #2 stopping the transmission updates its own timeout period ($T_{TO\#2}$). The interrogator #2, to begin with, increments a timeout counter (N). Whatever numerical value is available as the number to be incremented. Subsequently, the interrogator #2 adds a value obtained by multiplying the incremented timeout counter value (N) by a timeout step value (T) to the initial timeout period ($T_{INIT}$) The interrogator #2 sets a value obtained from this operation as its own timeout period ($T_{TO\#2}$). The timeout step value (T) may involve using a value previously stored on the memory etc., wherein a period such as 200 ms is set.

The interrogator #1 normally continues the transmission till the elapse of the maximum consecutive transmission period (T1), and, after the elapse of this period, stops the transmission. At this time, the interrogator #1 resets its own timeout period ($T_{TO\#1}$) to the initial timeout period. Note that the interrogator #1 may again update the initial timeout period ($T_{INIT}$) by using a random number. In the case of further continuing the transmission, the interrogator #1, after an elapse of the minimum transmission stop period (T2), starts the transmission through redoing the carrier sense.

In the example in FIG. 4, when transmitted by this interrogator #1, the interrogator #2 finishes stopping the transmission for the fixed period (T3) and, after redoing the carrier sense, resumes the transmission. With this operation, the wireless tag again gets into the communication unable state.

The timeout period ($T_{TO\#2}$) of the interrogator #2 is longer at this time than the timeout period ($T_{TO\#1}$) of the interrogator #1. This is because the interrogator #2 has already updated the timeout period in the previous process. Hence, it follows that the interrogator #1 detects the timeout earlier this time.

The interrogator #1 detecting the timeout immediately stops the transmission and updates the timeout period ($T_{TO\#1}$). A method of updating the timeout period is the same as in the case of the interrogator #2 described above. Namely, the interrogator #1 adds the value obtained by multiplying the incremented timeout counter value (N) by the timeout step value (T) to the initial timeout period ($T_{INIT}$), and sets the value obtained from this addition as the timeout period ($T_{TO\#1}$).

On the other hand, the interrogator #2, since the communications are restored before the elapse of the timeout period ($T_{TO\#2}$), continues the communications without the timeout being detected. The interrogator #2 can continue the communications till the maximum consecutive transmission period (T1) elapses. The interrogator #2 stops the transmission after the elapse of the maximum consecutive transmission period (T1), and resets the timeout period ($T_{TO\#2}$) to the initial timeout period ($T_{INIT}$).

Thus, the example in FIG. 4 is that the transmission chances are allocated to the interrogators #1, #2, #1 and #2 in this sequence.

Figure 5A:
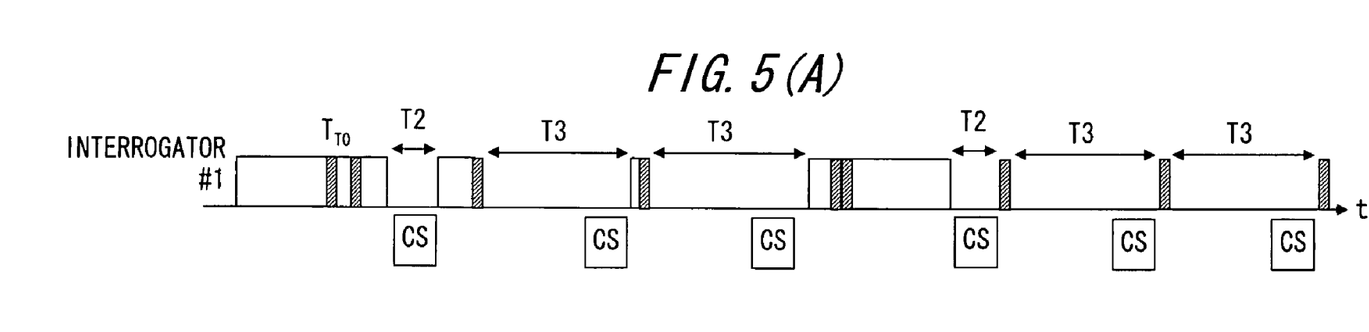
Figure 5B:
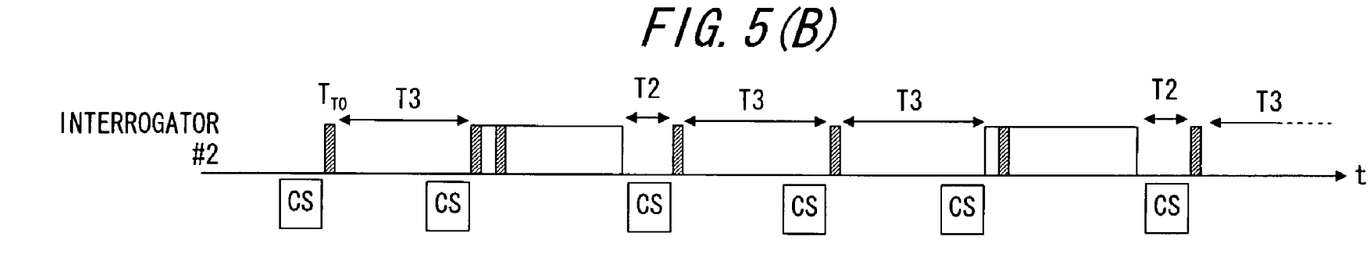
Figure 5C:
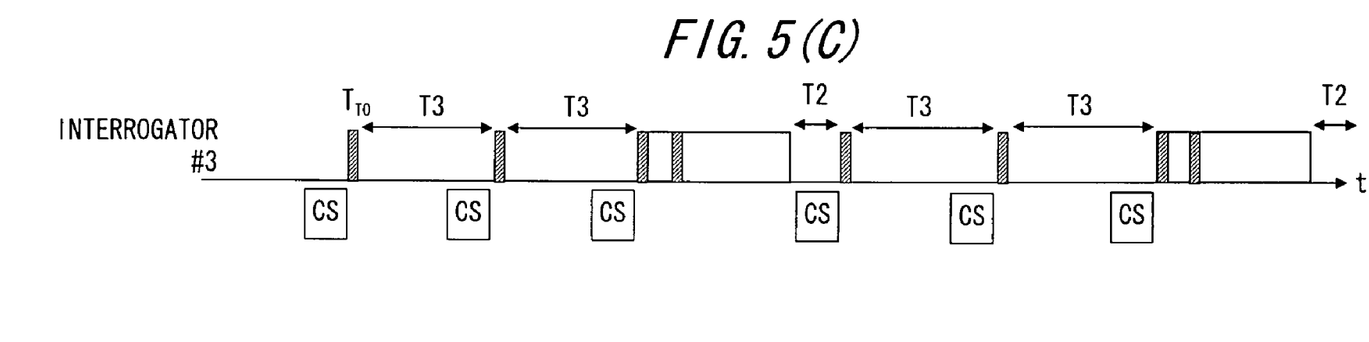

Further, in the aforementioned example in FIG. 4, the transmission control in the case of closely installing the two interrogators has been described, however, the same control is conducted also in the case of closely installing three interrogators. FIG. 5 is a diagram showing an outline of the transmission control in the case where the three interrogators in the second embodiment are closely installed.

As shown in FIG. 5, in the case of the three interrogators close to each other, the transmission chances are allocated to the interrogators #1, #2 and #3 in this sequence. This is because in the interrogators in the first embodiment, the timeout period elongates in proportion to an occurrence count of the transmission stoppage due to the timeout, so that the timeout becomes harder to be detected as the a wait count gets larger.

<Operation Flow>

Figure 6:
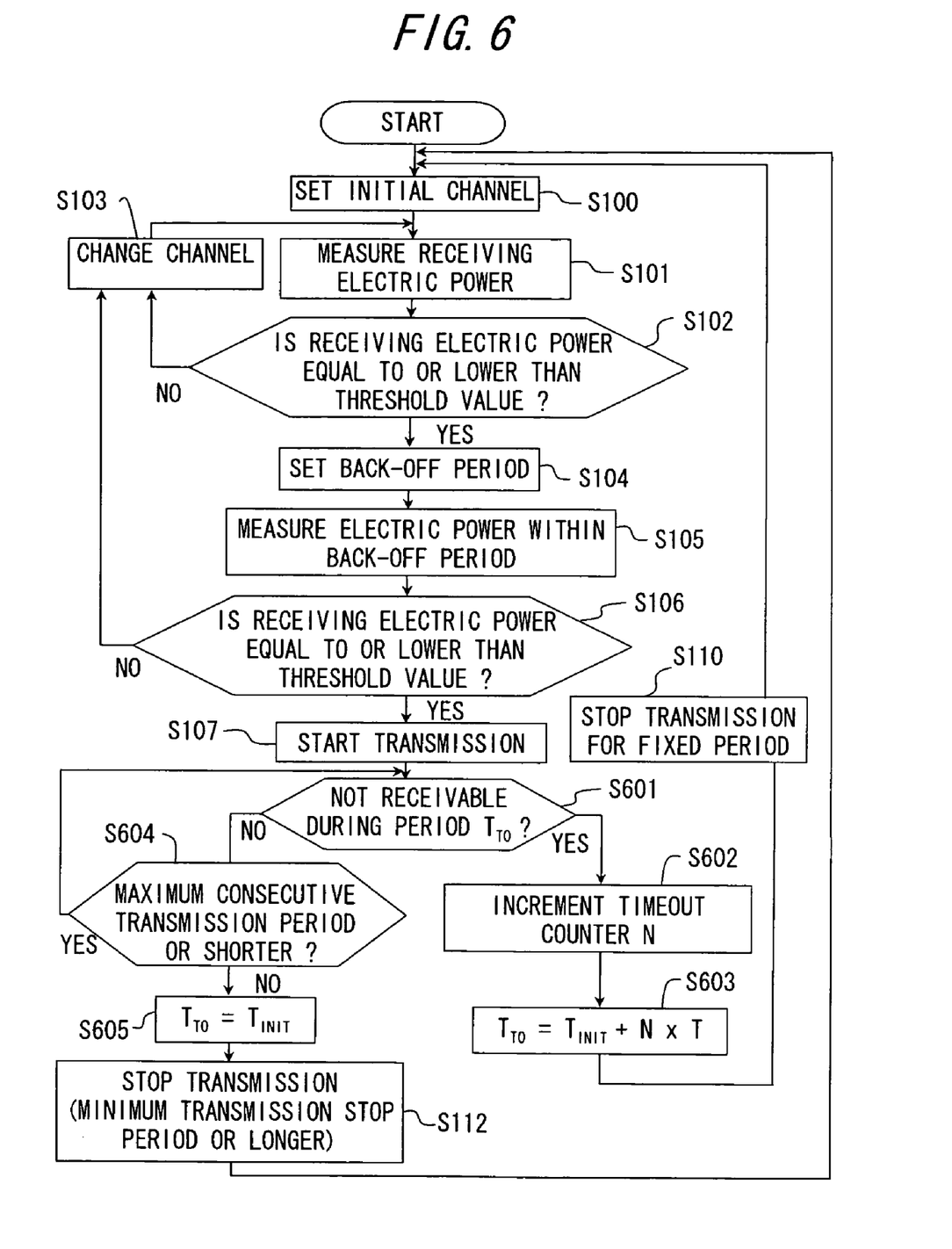
FIG. 6 is a flowchart showing a transmission control processing flow of the interrogator in the second embodiment.

A processing flow of the transmission control of the interrogator in the second embodiment will be explained with reference to FIG. 6. FIG. 6 is a flowchart showing the transmission control processing flow of the interrogator in the second embodiment.

The interrogator, when communicating with the wireless tag, at first, conducts the carrier sense (S100 through S106). Thereafter, the interrogator starts the transmission by use of the idle channel acquired by the carrier sense (S107). Note that the process of the carrier sense is the same as in the first embodiment, and hence its explanation is omitted.

The interrogator, during the communications with the wireless tag, detects whether the communication timeout occurs or not (S601). The interrogator, if the communication unable state continues for the self-retained timeout period ($T_{TO}$) or longer (S601; YES), judges this to be the communication timeout. When detecting the communication timeout (S601; YES), the interrogator updates the timeout period ($T_{TO}$) (S602, S603) and keeps stopping the transmission for the fixed period of time (S110). The timeout period is, specifically, the timeout counter value (N) being incremented (S602), obtained based on this incremented timeout counter value (N) by the following formula. The interrogator, when performing a further transmission, executes the processing again from the carrier sense after the transmission has been kept stopping for the fixed period of time (S100).

Timeout Period ($T_{TO}$)=Initial Timeout Period ($T_{INIT}$)+ Timeout Counter Value (N)×Timeout Step Value (T)

Whereas if normally transmitted without any occurrence of the timeout (S601; NO), the interrogator can continue the transmission till the elapse of the maximum consecutive transmission period (S604; YES).

If the maximum consecutive transmission period elapses during the continuation of the transmission process (S604; NO), the interrogator resets the timeout period ($T_{TO}$) to the initial timeout period ($T_{INIT}$) (S605). At this time, the interrogator may again set the initial timeout period ($T_{INIT}$) by use of a random number.

Thereafter, the interrogator keeps stopping the transmission for the minimum transmission stop period or longer (S112). The interrogator, when performing a further transmission, executes the processing again from the carrier sense after the elapse of the minimum transmission stop period (S100).

<Operation/Effect in Second Embodiment>

Herein, an operation and an effect of the interrogator in the second embodiment discussed above will be described.

In the interrogator according to this embodiment, the timeout period defined as the predetermined period for detecting the abnormality in the communications with the wireless tag, is updated corresponding to the communication state of the interrogator.

If normally transmitted till the elapse of the maximum consecutive transmission period, the timeout period is set to the initial value (the initial timeout period). Whereas if the timeout is detected during the transmission, the timeout period is so updated as to elongate in proportion to a detection count of the timeout.

The interrogator in this embodiment performs the transmission control by employing the thus-updated timeout period. Similarly to the first embodiment, to start with, the idle channel is detected by the carrier sense, and the transmission is started. Then, when the timeout is detected during the transmission by use of the timeout period at that time, the transmission is kept stopping for the fixed period of time. Further, if the timeout is not detected, the transmission continues for the maximum consecutive transmission period.

Namely, in the interrogator according to this embodiment, similarly to the first embodiment, the transmission is started via the idle channel detected by the carrier sense, and hence the signal interference between the adjacent interrogators can be avoided.

Moreover, in the interrogator according to this embodiment, if the timeout occurs, the transmission is kept stopping for the fixed period of time, so that it is possible to avoid the case (the interrogator-to-tag interference) of getting into the communication unable state due to the simultaneous reception of the signal transmitted via the different channel from the different interrogator.

Still further, the timeout period is so updated as to elongate each time the timeout is detected, and therefore the control is done so as to increase a probability of acquiring the transmission chance each time the timeout count (the transmission wait count) rises. Hence, the transmission chance is impartially obtained between the interrogators while actualizing the avoidance of the interference in the wireless tag.

MODIFIED EXAMPLE

In the second embodiment discussed above, the timeout period is so updated as to elongate each time the timeout is detected, however, a priority level is provided for every data transmitted by the interrogator, and the timeout period may also be determined corresponding to this priority level. For example, when the priority level of the data is high, the control is done so that the timeout period elongates. Further, the priority level may also be provided for every interrogator.

With this contrivance, the transmission opportunity is allocated corresponding to the priority level of the signal to be transmitted or the priority level of the interrogator.

<Others>

The disclosures of Japanese patent application No.JP2005-248988, filed on Aug. 30, 2005 including the specification, drawings and abstract are incorporated herein by reference.

What is claimed is:

1. An interrogator to transmit and receive a signal to and from a wireless tag, comprising:

a carrier sense unit to detect an idle channel in a plurality of channels used for communications with the wireless tag;

a transmitting unit to transmit the signal to the wireless tag by use of the detected idle channel;

a detecting unit to detect communication timeout when an abnormality in the communications with the wireless tag continues for a predetermined timeout period; and a control unit to control the transmitting unit to interrupt the transmission to the wireless tag when the detecting unit detects the communication timeout within a predetermined observation period from a point of time when starting the transmission of the signal to the wireless tag, while continue the transmission to the wireless tag when the detecting unit detects the communication timeout after the predetermined observation period, and to control the carrier sense unit and the transmitting unit to re-detect an idle channel after elapse of a predetermined halt period from the transmission interruption due to the detection of the communication timeout and resume the transmission to the wireless tag by using the re-detected idle channel.

2. An interrogator to transmit and receive a signal to and from a wireless tag, comprising:

a carrier sense unit to detect an idle channel in a plurality of channels used for communications with the wireless tag;

a transmitting unit to transmit the signal to the wireless tag by use of the detected idle channel;

a detecting unit to detect communication timeout when an abnormality in the communications with the wireless tag continues for a predetermined timeout period;

a control unit to control the carrier sense unit and the transmitting unit to interrupt, when detecting the communication timeout, the transmission to the wireless tag, re-detect an idle channel after elapse of a predetermined halt period from the transmission interruption due to the detection of the communication timeout, and resume the transmission to the wireless tag by using the re-detected idle channel; and a changing unit to change the predetermined timeout period depending on a priority level of the transmission to the wireless tag.

3. The interrogator according to claim 2, wherein the changing unit determines the priority level of the transmission according to the number of interrupting the transmission due to the detection of the communication timeout.

4. The interrogator according to claim 3, wherein the changing unit makes the priority level of the transmission higher as the number of interrupting the transmission due to the detection of the communication timeout becomes larger, and makes the predetermined timeout period longer as the priority level of the transmission becomes higher.

5. The interrogator according to claim 1, wherein the control unit controls the transmitting unit to stop the transmission to the wireless tag after elapse of a predetermined maximum consecutive transmission period if the transmission to the wireless tag is continued for the predetermined maximum consecutive transmission period, and wherein the predetermined halt period between the transmission interruption due to the detection of the communication timeout and the re-detection of the idle channel is set to the predetermined maximum consecutive transmission period.

6. A data communication method in an interrogator to transmit and receive a signal to and from a wireless tag, comprising:

detecting an idle channel in a plurality of channels used for communications with the wireless tag;

transmitting the signal to the wireless tag by use of the detected idle channel;

detecting communication timeout when an abnormality in the communications with the wireless tag continues for a predetermined timeout period;

interrupting the transmission to the wireless tag when detecting the communication timeout within a predetermined observation period from a point of time when starting the transmission of the signal to the wireless tag, while, not-interrupting the transmission to the wireless tag when detecting the communication timeout after the predetermined observation period;

re-detecting an idle channel after elapse of a predetermined halt period from the transmission interruption due to the detection of the communication timeout; and resuming the transmission to the wireless tag by using the re-detected idle channel.

7. A data communication method in an interrogator to transmit and receive a signal to and from a wireless tag, comprising:

detecting an idle channel in a plurality of channels used for communications with the wireless tag;

transmitting the signal to the wireless tag by use of the detected idle channel;

detecting communication timeout when an abnormality in the communications with the wireless tag continues for a predetermined timeout period;

interrupting the transmission to the wireless tag when detecting the communication timeout;

re-detecting an idle channel after elapse of a predetermined halt period from the transmission interruption due to the detection of the communication timeout;

resuming the transmission to the wireless tag by using the re-detected idle channel; and changing the predetermined timeout period depending on a priority level of the transmission to the wireless tag.

8. The data communication method according to claim 7, wherein the changing the predetermined timeout period determines the priority level of the transmission according to the number of interrupting the transmission in the case of detecting the communication timeout.

9. The data communication method according to claim 8, wherein the changing the predetermined timeout period makes the priority level of the transmission higher as the number of interrupting the transmission due to the detection of the communication timeout becomes larger, and makes the predetermined timeout period longer as the priority level of the transmission becomes higher.

10. The data communication method according to claim 6, further comprising:

stopping the transmission to the wireless tag after elapse of a predetermined maximum consecutive transmission period if the transmission to the wireless tag is continued for the predetermined maximum consecutive transmission period, wherein the predetermined halt period between the transmission interruption due to the detection of the communication timeout and the re-detection of the idle channel is set to the predetermined maximum consecutive transmission period.

* * * * *